US008521980B2

(12) United States Patent
Gillingham (10) Patent No.: US 8,521,980 B2
(45) Date of Patent: Aug. 27, 2013

(54) SIMULTANEOUS READ AND WRITE DATA TRANSFER

(75) Inventor: Peter B. Gillingham, Ottawa (CA)

(73) Assignee: MOSAID Technologies Incorporated, Ottawa (CA)

(*) Notice: Subject to any disclaimer, the term of this patent is extended or adjusted under 35 U.S.C. 154(b) by 1076 days.

(21) Appl. No.: 12/504,156

(22) Filed: Jul. 16, 2009

(65) Prior Publication Data

US 2011/0016279 A1 Jan. 20, 2011

(51) Int. Cl.
*G06F 12/00* (2006.01)
*G06F 13/00* (2006.01)

(52) U.S. Cl.
USPC ............ 711/167; 711/100; 711/154; 711/170

(58) Field of Classification Search
USPC ................................. 711/100, 154, 167, 170
See application file for complete search history.

(56) References Cited

U.S. PATENT DOCUMENTS

| | | | |
|---|---|---|---|
| 4,174,536 A | 11/1979 | Misunas et al. | |
| 4,434,459 A * | 2/1984 | Holland et al. | 712/210 |
| 4,617,566 A | 10/1986 | Diamond | |
| 4,796,231 A | 1/1989 | Pinkham | |
| 4,899,316 A | 2/1990 | Nagami | |
| 5,132,635 A | 7/1992 | Kennedy | |
| 5,204,669 A | 4/1993 | Dorfe et al. | |
| 5,243,703 A | 9/1993 | Farmwald et al. | |
| 5,319,598 A | 6/1994 | Aralis et al. | |
| 5,404,460 A | 4/1995 | Thomsen et al. | |
| 5,430,859 A | 7/1995 | Norman et al. | |
| 5,452,259 A | 9/1995 | McLaury | |
| 5,475,854 A | 12/1995 | Thomsen et al. | |
| 5,602,780 A | 2/1997 | Diem et al. | |
| 5,671,178 A | 9/1997 | Park et al. | |
| 5,740,379 A | 4/1998 | Hartwig | |
| 5,778,419 A | 7/1998 | Hansen et al. | |
| 5,802,399 A | 9/1998 | Yumoto et al. | |
| 5,828,899 A | 10/1998 | Richard et al. | |
| 5,859,809 A | 1/1999 | Kim | |
| 5,941,974 A | 8/1999 | Babin | |
| 6,002,638 A | 12/1999 | John | |
| 6,075,728 A * | 6/2000 | Inoue et al. | 365/189.2 |
| 6,081,860 A * | 6/2000 | Bridges et al. | 710/110 |
| 6,091,660 A | 7/2000 | Sasaki et al. | |
| 6,144,576 A | 11/2000 | Leddige et al. | |
| 6,148,364 A | 11/2000 | Srinivasan et al. | |
| 6,304,921 B1 | 10/2001 | Rooke | |

(Continued)

FOREIGN PATENT DOCUMENTS

WO 01/69411 A2 9/2001
WO 2006036811 A2 4/2006

OTHER PUBLICATIONS

PowerPoint Slides shown at a technical conference in Santa Clara, CA, USA in Aug. 2008 "HyperLink Q&A".

(Continued)

*Primary Examiner* — Tuan Thai
(74) *Attorney, Agent, or Firm* — Ridout & Maybee LLP (57) ABSTRACT

A controller for an arrangement of memory devices may issue a write command without waiting for the receipt of a previously issued read command. An addressed memory device may read data out onto the data bus according to a read command while, simultaneously, writing data according to a write command received subsequent to the read command.

15 Claims, 6 Drawing Sheets

(56) References Cited

U.S. PATENT DOCUMENTS

| | | | |
|---|---|---|---|
| 6,317,350 | B1 | 11/2001 | Pereira et al. |
| 6,317,352 | B1 | 11/2001 | Halbert et al. |
| 6,317,812 | B1 | 11/2001 | Lofgren et al. |
| 6,477,618 | B2 * | 11/2002 | Chilton .................. 711/113 |
| 6,594,183 | B1 | 7/2003 | Lofgren et al. |
| 6,658,509 | B1 | 12/2003 | Bonella et al. |
| 6,680,904 | B1 | 1/2004 | Kaplan et al. |
| 6,715,044 | B2 | 3/2004 | Lofgren et al. |
| 6,763,426 | B1 | 7/2004 | James et al. |
| 6,816,933 | B1 | 11/2004 | Andreas |
| 6,850,443 | B2 | 2/2005 | Lofgren et al. |
| 6,853,557 | B1 | 2/2005 | Haba et al. |
| 6,853,573 | B2 | 2/2005 | Kim et al. |
| 6,928,501 | B2 | 8/2005 | Andreas et al. |
| 6,944,697 | B2 | 9/2005 | Andreas |
| 6,950,325 | B1 | 9/2005 | Chen |
| 6,996,644 | B2 | 2/2006 | Schoch et al. |
| 7,031,221 | B2 | 4/2006 | Mooney et al. |
| 7,032,039 | B2 | 4/2006 | DeCaro |
| 7,093,076 | B2 | 8/2006 | Kyung |
| 7,130,958 | B2 | 10/2006 | Chou et al. |
| 7,177,170 | B2 | 2/2007 | Gomm |
| 7,180,778 | B2 | 2/2007 | Kawai et al. |
| 7,290,091 | B2 * | 10/2007 | Savell et al. .................. 711/118 |
| 7,774,559 | B2 * | 8/2010 | Cronin et al. .................. 711/154 |
| 2002/0188781 | A1 | 12/2002 | Schoch et al. |
| 2004/0001380 | A1 | 1/2004 | Becca et al. |
| 2004/0024960 | A1 | 2/2004 | King et al. |
| 2004/0148482 | A1 | 7/2004 | Grundy et al. |
| 2005/0166006 | A1 | 7/2005 | Talbot et al. |
| 2006/0031593 | A1 | 2/2006 | Sinclair |
| 2007/0038852 | A1 | 2/2007 | Bovino et al. |
| 2007/0064629 | A1 | 3/2007 | Regev et al. |
| 2007/0076479 | A1 | 4/2007 | Kim et al. |
| 2007/0076502 | A1 | 4/2007 | Pyeon et al. |
| 2007/0109833 | A1 | 5/2007 | Pyeon et al. |
| 2007/0153576 | A1 | 7/2007 | Oh et al. |
| 2007/0157000 | A1 | 7/2007 | Qawami et al. |
| 2007/0233903 | A1 | 10/2007 | Pyeon |
| 2007/0234071 | A1 | 10/2007 | Pyeon |
| 2008/0016269 | A1 | 1/2008 | Chow et al. |
| 2008/0019189 | A1 | 1/2008 | Lin |
| 2008/0019196 | A1 | 1/2008 | Lin |
| 2008/0049505 | A1 | 2/2008 | Kim et al. |
| 2008/0052449 | A1 | 2/2008 | Kim et al. |
| 2008/0080492 | A1 | 4/2008 | Pyeon et al. |
| 2008/0155219 | A1 | 6/2008 | Pyeon et al. |
| 2008/0198682 | A1 | 8/2008 | Pyeon |
| 2008/0201496 | A1 | 8/2008 | Gillingham |
| 2008/0201548 | A1 | 8/2008 | Przybylski et al. |
| 2008/0205187 | A1 | 8/2008 | Pyeon |
| 2008/0215778 | A1 | 9/2008 | Sumi |
| 2009/0021992 | A1 | 1/2009 | Oh |
| 2009/0039927 | A1 | 2/2009 | Gillingham et al. |
| 2009/0063786 | A1 | 3/2009 | Oh |
| 2009/0103378 | A1 | 4/2009 | Schuetz et al. |
| 2009/0129184 | A1 | 5/2009 | Schuetz |
| 2009/0154285 | A1 | 6/2009 | Pyeon |
| 2009/0154629 | A1 | 6/2009 | Pyeon et al. |

OTHER PUBLICATIONS

Peter Gillingham, PowerPoint Slides shown at Joint Electron Device Engineering Council (JEDEC) Future NAND Task Group Meeting "HLNAND: A New Standard for High Performance Flash Memory" Feb. 22, 2008.
Peter Gillingham, Powerpoint Slides shown at JEDEC Future NAND Task Group Meeting on Feb. 13, 2008, "NAND-ONF1 2.0-HL1 Comparison".
Stein Gjessing, David B. Gustavson, David V James, Glen Stone & Hans Wiggers; A RAM Link for High Speed; IEEE Spectrum; vol. 29, No. 10; Oct. 1992; pp. 52-53; 0018-9235/92/.
Stein Gjessing & Glen Stone; Performance of the Ramlink Memory Architecture; Proceedings of the Twenty-Seventh Annual Hawaii International Conference on System Sciences, 1994; pp. 154-162; 1060-3425/94.
Stein Gjessing, Glen Stone & Hans Wiggers; Ramlink: A High-Bandwidth Point-To-Point Memory Architecture; IEEE Spectrum; 1992; pp. 328-331; 0-8186-2655-0/92/.
Stephen L. Diamond, Synclink:High Speed DRAM for the Future; IEEE Micro, Dec. 1996; pp. 74-75.
The Institute of Electrical and Electronics Engineers, Inc.; IEEE Standard for High-Bandwidth Memory Interface Based on Scalable Coherent Interface (SCI) Signaling Technology (RAMLINK); IEEE Std 1596.4-1996; Mar. 19, 1996; pp. 1-98; ISBN 1-55937-745-3.
Yoichi Oshima; Bing Shed & Steve H. Jens; High-Speed Memory Architectures for Multimedia Applications; Circuits & Devices; IEEE; Jan. 1997; 8755-3996/97.
International Search Report mailed Jun. 4, 2008 and issued in connection with corresponding International Application No. PCT/CA2007/001789.
Takeuchi, K. et al, A 56nm CMOS 99mm2 8Gb Multi-level NAND Flash Memory with 10MB/s Program Throughput, Solid-State Circuits, 2006 IEEE International Conference Digest of Technical Papers, Session 7, Feb. 6-9, 2006, pp. 507-516, ISBN: 1-4244-0079-1.
Samsung Electronics Co. Ltd, 256M×8 Bit / 128 M×16 Bit / 512M×8 Bit NAND Flash Memory, K9K4GO8U1M, May 6, 2005, pp. 1-41.
Toshiba, 2GBIT (256M×8 Bits) CMOS NAND E2PROM, TH58NVG1S3AFT05, May 19, 2003, pp. 1-32.
Atmel Corp., High Speed Small Sectored SPI Flash Memory, pp. 1-23, 2006.
Spansion, 64 Megabit CMOS 3.0 Volt Flash Memory with 50MHz SPI (Serial Peripheral Interface) Bus, , pp. 1-32, Sep. 6, 2006.
King et al, Communicating with Daisy Chained MCP42XXX Digital Potentiometers, Microchip AN747, pp. 1-8, 2001.
Intel Corporation, Intel® Advanced+ Boot Block Flash Memory (C3), May 2005, pp. 1-72.
M-Systems Flash Disk Pioneers Ltd., DiskOnChip H1 4Gb (512MByte) and 8Gb (1 GByte) High Capacity Flash Disk with NAND and x2 Technology, Data Sheet, Rev. 0.5 (Preliminary), pp. 1-66, 2005.
Samsung Electronics Co. Ltd, OneNAND4G(KFW4G16Q2M-DEB6), OneNAND2G(KFH2G16Q2M-DEB6), OneNAND1G(KFG1G16Q2M-DEB6) Flash Memory, OneNAND™ Specification Ver. 1.2, pp. 1-125, Dec. 23, 2005.
Kennedy, J., et al., A 2Gb/s Point-to-Point Heterogeneous Voltage Capable DRAM Interface for Capacity-Scalable Memory Subsystems, ISSCC 2004/Session 11/DRAM/11.8, IEEE International Solid-State Circuits Conference, Feb. 15-19, 2004, vol. 1, pp. 214-523.
Samsung Electronics, DDR2 Fully Buffered DIMM 240pin FBDIMMS based on 512Mb C-die Rev. 1.3, Sep. 2006, pp. 1-32.
Samsung Electronics, K9XXG08UXM Preliminary Flash Memory, Technical Specification, Samsung Electronics, 43 pages.
Hypertransport TM I/O Link Specification, Revision 3.00, Document No. HTC20051222-0046-0008, HyperTransport Technology Consortium, pp. 1-428, Apr. 21, 2006.
Peter Gillingham, PowerPoint Slides shown at Joint Electron Device Engineering Council (JEDEC) Future NAND Task Group Meeting "HLNAND: A New Standard for High Performance Flash Memory", Aug. 2008.
PowerPoint Slides shown at a technical conference in Santa Clara, CA, USA in Feb. 22, 2008.

* cited by examiner

| Operation | Command (2 Bytes) | | Row Address (3 Bytes) | Column Address (2 Bytes) | Input Data (1 to 2112 Bytes) |
|---|---|---|---|---|---|
| | Device Address (1 Byte) | Operation Code (1 Byte) | | | |
| Page Read | Valid | 0Xh | Valid | - | - |
| Page Read for Copy | Valid | 1Xh | Valid | - | - |
| Burst Data Read | Valid | 2Xh | - | Valid | - |
| Burst Data Load Start | Valid | 4Xh | - | Valid | Valid |
| Burst Data Load | Valid | 5Xh | - | Valid | Valid |
| Page Program | Valid | 6Xh | Valid | - | - |
| Partial Block Erase Address Input | Valid | 7Xh | Valid | - | - |
| Block Erase Address Input | Valid | 8Xh | Valid | - | - |
| Page-pair Erase Address Input | Valid | 9Xh | Valid | - | - |
| Erase | Valid | AXh | - | - | - |
| Operation Abort | Valid | CXh | - | - | - |
| Read Status Register | Valid | F0h | - | - | - |
| Read Device Information Register | Valid | F4h | - | - | - |
| Read Link Configuration Register | Valid | F7h | - | - | - |
| Write Link Configuration Register | FFh | FFh | - | - | Valid (1 Byte only) |

SIMULTANEOUS READ AND WRITE DATA TRANSFER

FIELD

The present application relates generally to a controller and a set of controlled memory devices and, more specifically, to adapting the controller and the memory devices to handle simultaneous read and write data transfer operations.

BACKGROUND

In a typical electronic memory arrangement, reading from and writing to several memory devices is organized by a controller. Double-data-rate synchronous dynamic random access memory (DDR SDRAM) is an example of such an arrangement. For a write operation, the controller indicates, on a command bus, a write command, and indicates, on an address bus, a location on the particular memory device at which the data is to be stored, and then transmits data to be written to the memory on a data bus. For a read operation, the controller indicates, on the command bus, a read command, and indicates, on an address bus, a location on the particular memory device from which the data is to be read. The memory device responds to the read command and address by transmitting the requested read data on the data bus.

In contrast, in an alternative electronic memory arrangement, memory devices are arranged in a ring or loop. Rather than a data bus, there is a data connection between a controller and an initial memory device in the ring. The data connection may, for example, be a multibit bus. A data signal received at the initial memory device on the data connection is passed on to a second memory device on an other data connection and a data signal received at the second memory device on the other data connection is passed on to a third memory device on a further data connection, etc. Thus, the data signal propagates around the ring until the data signal is returned to the controller. In addition to the data signal propagating through the ring, there are additional signals also propagating through the ring: a Command Strobe signal; and a Data Strobe signal.

For a write operation, the controller causes the Command Strobe signal to transition from "0" to "1" to indicate the start of a packet. Simultaneously, the controller starts to transmit, on the data connection, a write packet that includes: a write command indicating a particular memory device and address to which data is to be written followed by the data that is to be written. The controller then causes the Command Strobe signal to transition from "1" to "0" to indicate the end of the write packet.

For a read operation, the controller causes the Command Strobe signal to transition from "0" to "1" to indicate the start of a packet. Simultaneously, the controller starts to transmit, on the data connection, a read command packet that includes: a read command indicating a particular memory device and address from which the data is to be read. The controller then causes the Command Strobe signal to transition from "1" to "0" to indicate the end of the read command packet. Subsequently, the controller causes the Data Strobe signal to transition from "0" to "1" to indicate, to the particular memory device, that the requested read data is be transmitted on the data connection.

In the ring arrangement, the read command primes a memory device for a read data transfer. The length of a read is arbitrary and interruptible since the end of the read data transfer operation is determined by a transition of the Data Strobe signal from "1" to "0". Similarly, the length of a write is arbitrary and interruptible since the end of the write data transfer operation is determined by a transition of the Command Strobe signal from "1" to "0".

As discussed, when memory devices are arranged in a ring, packets originate at a controller and flow unidirectionally through a ring of memory devices and back to the controller. Different configurations are possible based on either distributing a clock in parallel or sourcing the clock synchronously along with the data and strobes. The second configuration has a potentially higher pin overhead than the first configuration based on extra differential clock output pins on the memory devices.

BRIEF DESCRIPTION OF THE DRAWINGS

Reference will now be made to the drawings, which show by way of example, embodiments of the invention, and in which.

DETAILED DESCRIPTION OF THE EMBODIMENTS

As a preliminary note, "#" as used herein means inverse. As an example, CLK# is the inverse of CLK.

Continuing on, in accordance with some example embodiments, a memory controller may increase efficiency and bus utilization of controlled memory devices connected in a ring by arranging simultaneous transfer of read data from a memory device and transfer of write data to another memory device for those situations for which the memory device addressed by the read command is downstream of or the same as the memory device addressed by the write command.

In accordance with an example embodiment, there is provided, at a controller, a method of issuing commands at a memory device controller for controlling a plurality of memory devices connected in a ring arrangement such that output from a given memory device in the plurality of memory devices is received as input by one next downstream memory device in the plurality of memory devices, the memory device controller arranged so that an initial memory device in the plurality of memory devices receives output from the controller as input and a final memory device in the plurality of memory devices provides output as input to the controller. The method includes transmitting a read command, the read command addressing a first memory device among the plurality of memory devices, transmitting a write command, the write command addressing a second memory device among the plurality of memory devices, the second memory device being upstream of the first memory device and arranging transfer of read data from the first memory device to occur at least substantially simultaneously with receipt of the write data at the second memory device. In other example embodiments, a memory device controller is provided for carrying out this method, a memory system is provided that includes a memory device controller for carrying out this method and a computer readable medium is provided for adapting a memory device controller to carry out this method.

In accordance with a further example embodiment, there is provided, a method of issuing commands at a memory device controller for controlling a plurality of memory devices connected in a ring arrangement such that output from a given memory device in the plurality of memory devices is received as input by one adjacent memory device in the plurality of memory devices, the memory device controller arranged so that an initial memory device in the plurality of memory devices receives output from the controller as input and a final memory device in the plurality of memory devices provides output as input to the controller. The method includes transmitting a read command, the read command addressing a memory device among the plurality of memory devices, transmitting a write command followed by write data, the write command addressing the memory device and arranging transfer of read data from the memory device to occur simultaneously at least substantially with receipt of the write data at the memory device.

In accordance with another example embodiment, there is provided, at a memory device in a ring arrangement, a method of handling commands. The method includes receiving a read command on an input port, subsequent to the receiving the read command, receiving a write command followed by write data on said input port and transmitting read data on an output port according to the read command while, at least substantially simultaneously, receiving at least a portion of the write data on said input port. In other example embodiments, a memory device is provided for carrying out this method.

In accordance with an even further example embodiment, there is provided a computer readable medium containing computer-executable instructions that, when performed by a memory device controller, cause the memory device controller to transmit a read command, the read command addressing a first memory device among the plurality of memory devices, transmit a write command followed by write data, the write command addressing a second memory device among the plurality of memory devices, the second memory device being upstream of the first memory device and arrange transfer of read data from the first memory device to occur at least substantially simultaneously with receipt of the write data at the second memory device.

Conveniently, aspects of the present application provide a memory, controller, or memory subsystem (either multidrop bus or ring topology)

Figure 1:
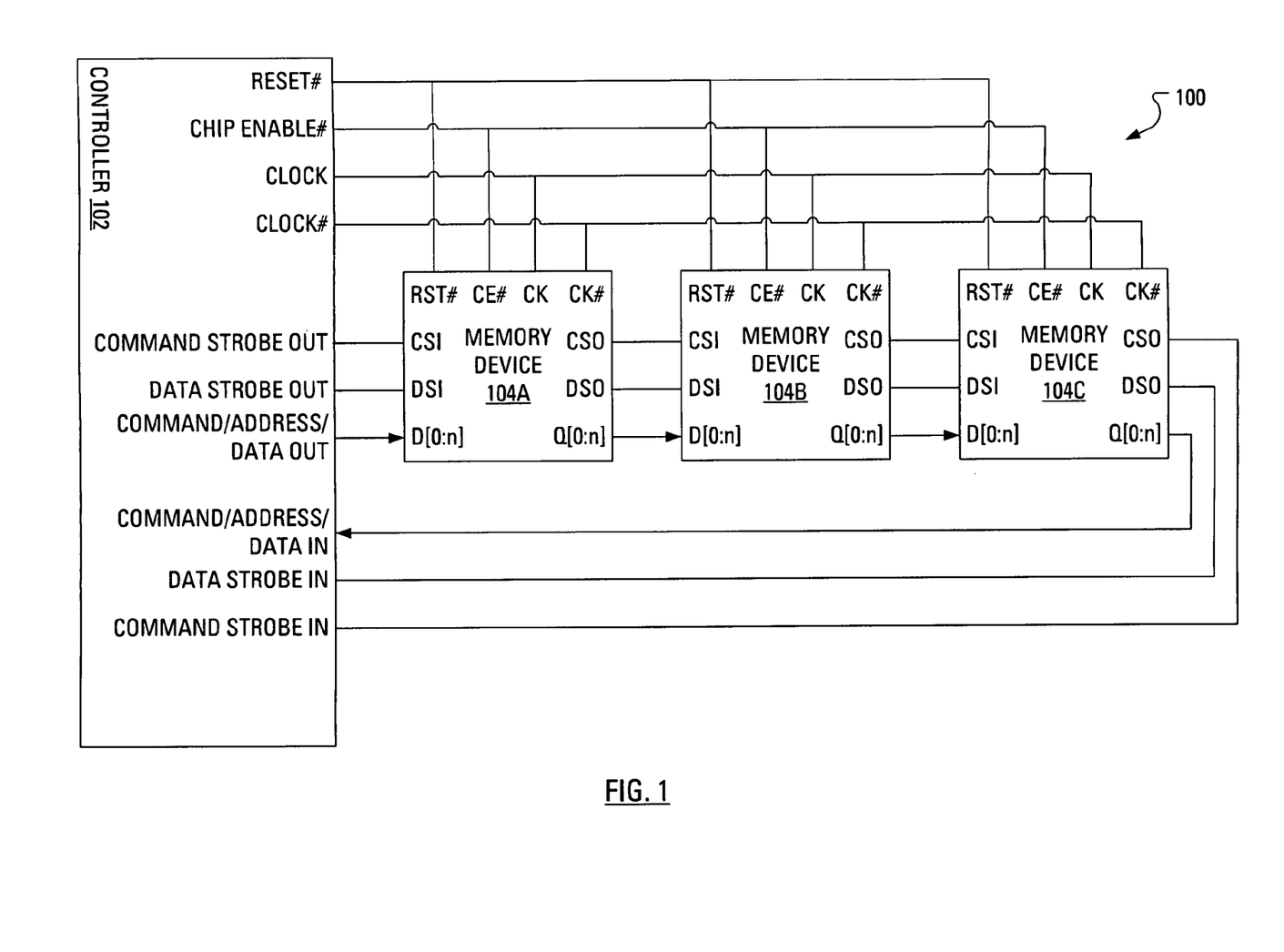
FIG. 1 illustrates a ring arrangement of memory devices configured for parallel clock distribution.

In an arrangement 100 illustrated in FIG. 1, a first memory device 104A, a second memory device 104B and a third memory device 104C (collectively or individually 104) are in a ring or loop arrangement. Operation of the memory devices 104 for writing or reading is organized by a controller 102.

The controller 102 is connected to the first memory device 104A by way of a Command Strobe Line, a Data Strobe Line and a Data bus. The Data bus may have a fixed bus width of one bit, two bits, four bits, eight bits or any other number of bits, or it may have a variable bus width programmable within a range, for example between one bit and eight bits. Similarly, the first memory device 104A is connected to the second memory device 104B by way of a Command Strobe Line, a Data Strobe Line and a Data bus. It follows that the second memory device 104B is connected to the third memory device 104C by way of a Command Strobe Line, a Data Strobe Line and a Data bus. Finally, the third memory device 104C is connected to the controller 102 by way of a Command Strobe Line, a Data Strobe Line and a Data bus. The controller 102 is also connected to each of the memory devices 104, in parallel, by a Reset line, a Chip Enable line, a Clock line and an inverse Clock line.

Figure 2:
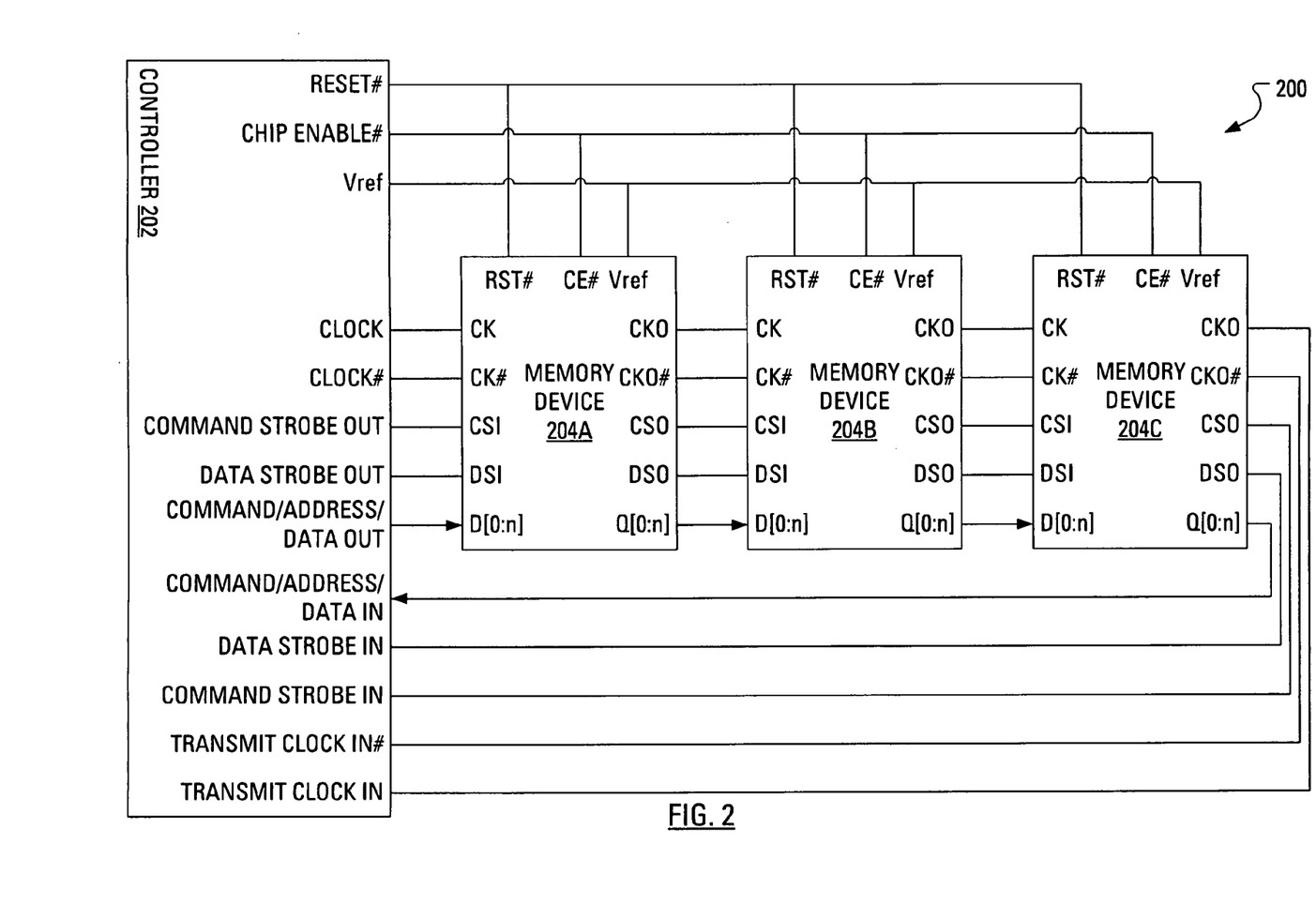
FIG. 2 illustrates a ring arrangement of memory devices configured for source synchronous clock distribution.

An arrangement 200 of memory devices illustrated in FIG. 2 differs from the arrangement 100 of FIG. 1 in that the clock signal (and the inverse of the clock signal) is distributed source synchronously with the strobes and data bus in the arrangement 200 of FIG. 2, whereas the clock signal (and the inverse of the clock signal) is distributed in a parallel manner in the arrangement 100 of FIG. 1.

In the arrangement 200 of FIG. 2, a controller 202 is connected to a first memory device 204A by way of a Command Strobe Line, a Data Strobe Line, a Data bus, a Clock line and an inverse Clock line. Similarly, the first memory device 204A is connected to a second memory device 204B by way of a Command Strobe Line, a Data Strobe Line, a Data bus, a Clock line and an inverse Clock line. It follows that the second memory device 204B is connected to a third memory device 204C by way of a Command Strobe Line, a Data Strobe Line, a Data bus, a Clock line and an inverse Clock line. Finally, the third memory device 204C is connected to the controller 202 by way of a Command Strobe Line, a Data Strobe Line, a Data bus, a Clock line and an inverse Clock line. The controller 202 is also connected to each of the memory devices 204, in parallel, by a Reset line, a Chip Enable line and a reference voltage line.

Figure 3:
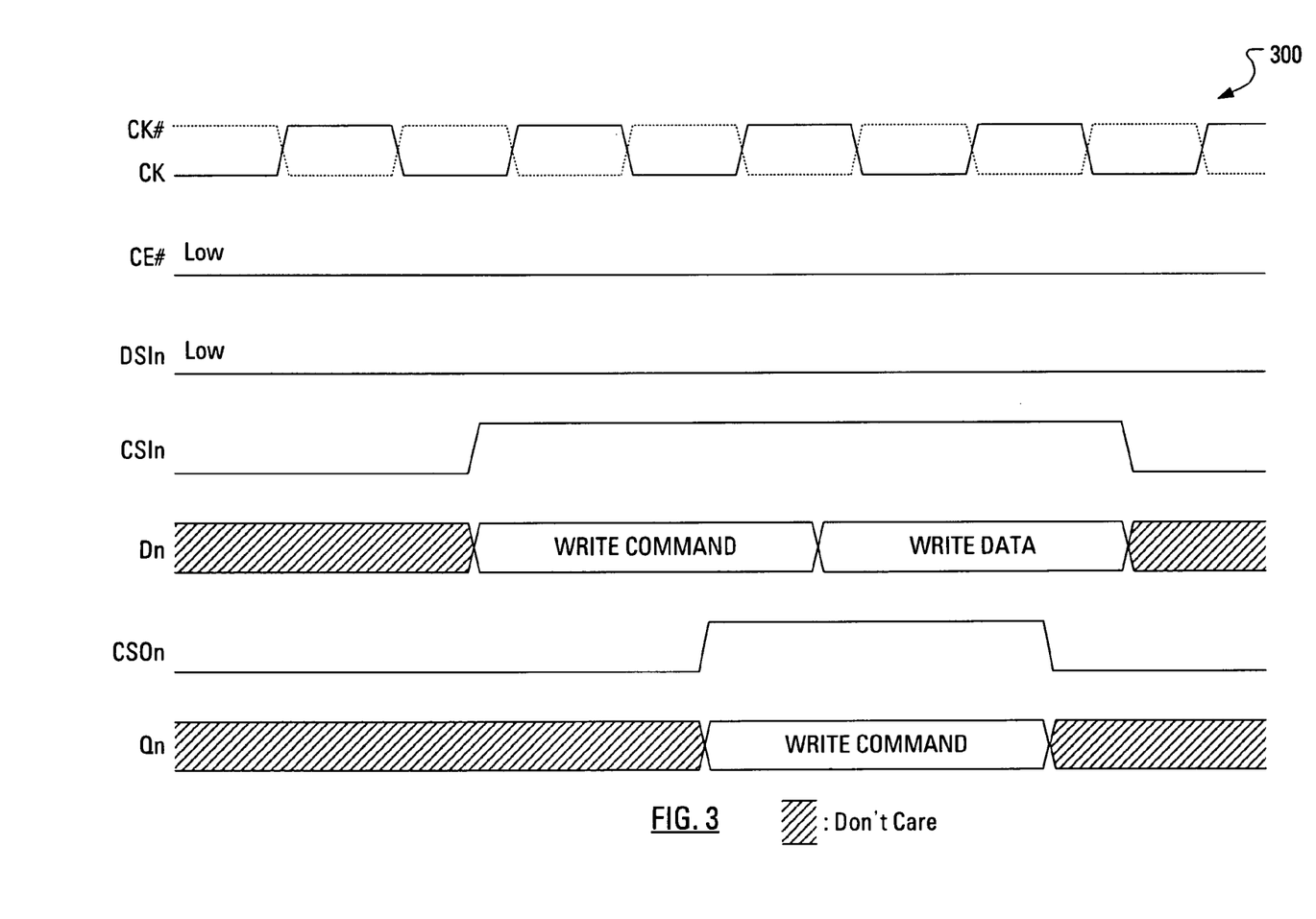
FIG. 3 illustrates a timing diagram for write command and write data timing for the arrangement of FIG. 1.

In a timing diagram 300 in FIG. 3, command and write data packet timing is illustrated for the arrangement 100 of FIG. 1. Inputs to an nth (generic) memory device 104 on the Data bus (that is possibly multibit) may be representative of a command, representative of data, representative of a target device address, or representative of an address within the memory device 104. A memory device 104 may capture (for example, shift in to registers) inputs on the Data bus on the crossing of the signal on the Clock line (CK) with the signal on the inverse Clock line (CK#) when the signal on the Chip Enable (CE#) line is at a logical LOW and the signal on the Command Strobe line (received at the CSI pin) is at a logical HIGH.

The timing diagram 300 of FIG. 3 illustrates timing of receipt, at the nth memory device 104, of a write command and a write data packet. The first three clock transitions during the period of time CSI is HIGH corresponds to the write command portion of the packet. The three words, which may, for example, be eight bit words, may represent a device address word, an instruction word and an address word. The device address word may indicate the memory device 104 in the ring to which the command is directed. The instruction word may indicate an instruction, in this case, a write instruction. The address word may indicate an address within the memory device 104 to which data is to be written. The next three clock transitions during the remainder of the time CSI is HIGH correspond to the write data portion of the packet, providing three data words to be written. In this example the device address word corresponds to the device receiving the packet. Note that the write data packet is not present at the output data bus (Qn). Truncation of the write data packet, by the memory device 104, saves power by eliminating unnecessary transitions on the memory devices 104 in the ring arrangement 100 following the addressed memory device 104. The memory device 104 also truncates the command strobe signal on CSOn to correspond with the output at the output data bus (Qn). Truncation of the write data packet allows a memory device 104 further down the ring to output read data onto the ring. If the write command and write data packet are not addressed to the memory device 104 receiving the packet, the device will not truncate the write data portion. There is a fixed latency between the time the packet is received at the input the device and retransmitted at the output of the device, in this example the latency is one clock cycle.

The controller 102 may wait until it has received the issued write command from the final memory device in the ring before issuing a new command, or it may issue a new command earlier as long as there is a minimum separation between command packets, regardless of whether the new command is a read or a write.

Figure 4:
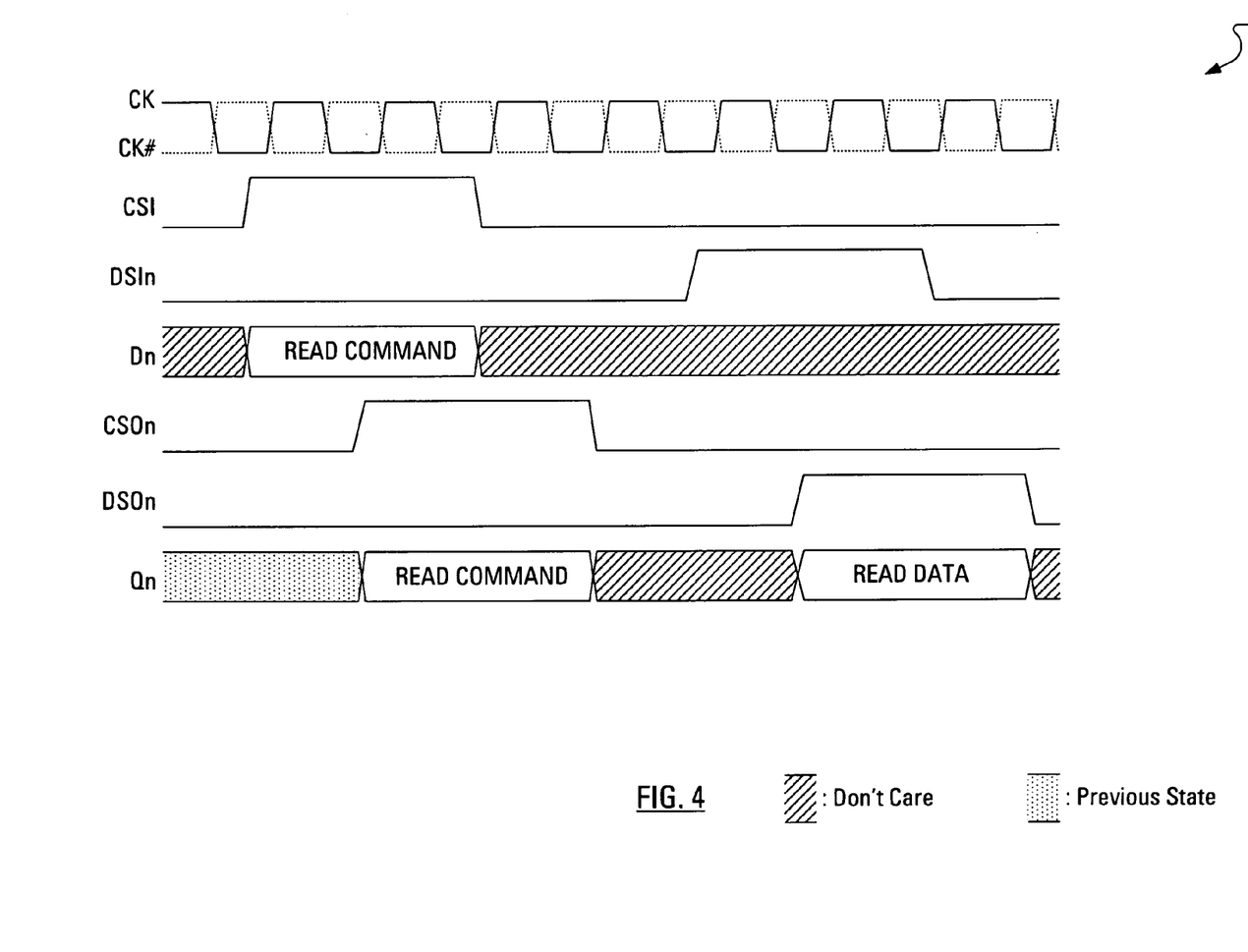
FIG. 4 illustrates a timing diagram for read command timing for the arrangement of FIG. 1.

In a timing diagram 400 in FIG. 4, read data packet timing is illustrated for the arrangement 100 of FIG. 1. Data on the Data bus may be synchronously shifted out at the crossing of the signal on the Clock line (CK) with the signal on the inverse Clock line (CK#) when the signal on the Chip Enable (CE#) line is at a logical LOW and the signal on the Data Strobe line (received at the DSI pin) is at a logical HIGH. There is a fixed latency in the memory from the time the logical HIGH on the DSI pin is received and when a logical HIGH on the DSO pin and the accompanying read data are output.

For a read operation, the controller 102 first sends a read command to an addressed memory device 104. Like the write command, the read command is delineated by the CSI strobe. The read command primes the addressed memory device 104. At a later time, the controller sends a DSI strobe to indicate when read data should be transmitted from the primed device to the next memory device 104 on the ring. A device that is not primed will transparently pass data received at the data bus inputs during the DSI HIGH period to the data bus outputs. In accordance with some examples, only one memory device 104 on the ring can be primed at any time in connection with a normal read command; however in the special case of a broadcast status read command (discussed subsequently) multiple memory device may be primed. Also, a device remains primed until a read command is sent to a different device or an abort command is sent. Therefore, a memory device can remain primed for any number of read bursts.

Typically, the controller 102 waits until the controller 102 has received the issued read command (and read data) from the final memory device in the ring before issuing a new command, or it may issue a new command earlier as long as there is a minimum separation between command packets, regardless of whether the new command is a read or a write.

In accordance with some examples there is a special case called a "broadcast status register read command", and in such a case all of the memory devices 104 in the ring are primed. Each memory device 104 appends status register data to the end of a received read data packet and extends the DSO strobe to encompass the appended data. Memory devices 104 automatically un-prime themselves after appending status register data. When normal read commands are issued in sequence to various memory devices 104 on the ring, one memory device 104 will always be primed. After a broadcast status read command is issued and the DSI strobe is sent to transfer status information from each memory device 104 to the controller 102, each memory device 104 will be un-primed and there will be no memory devices 104 on the on the ring that will respond to the DSI strobe.

Figure 5:
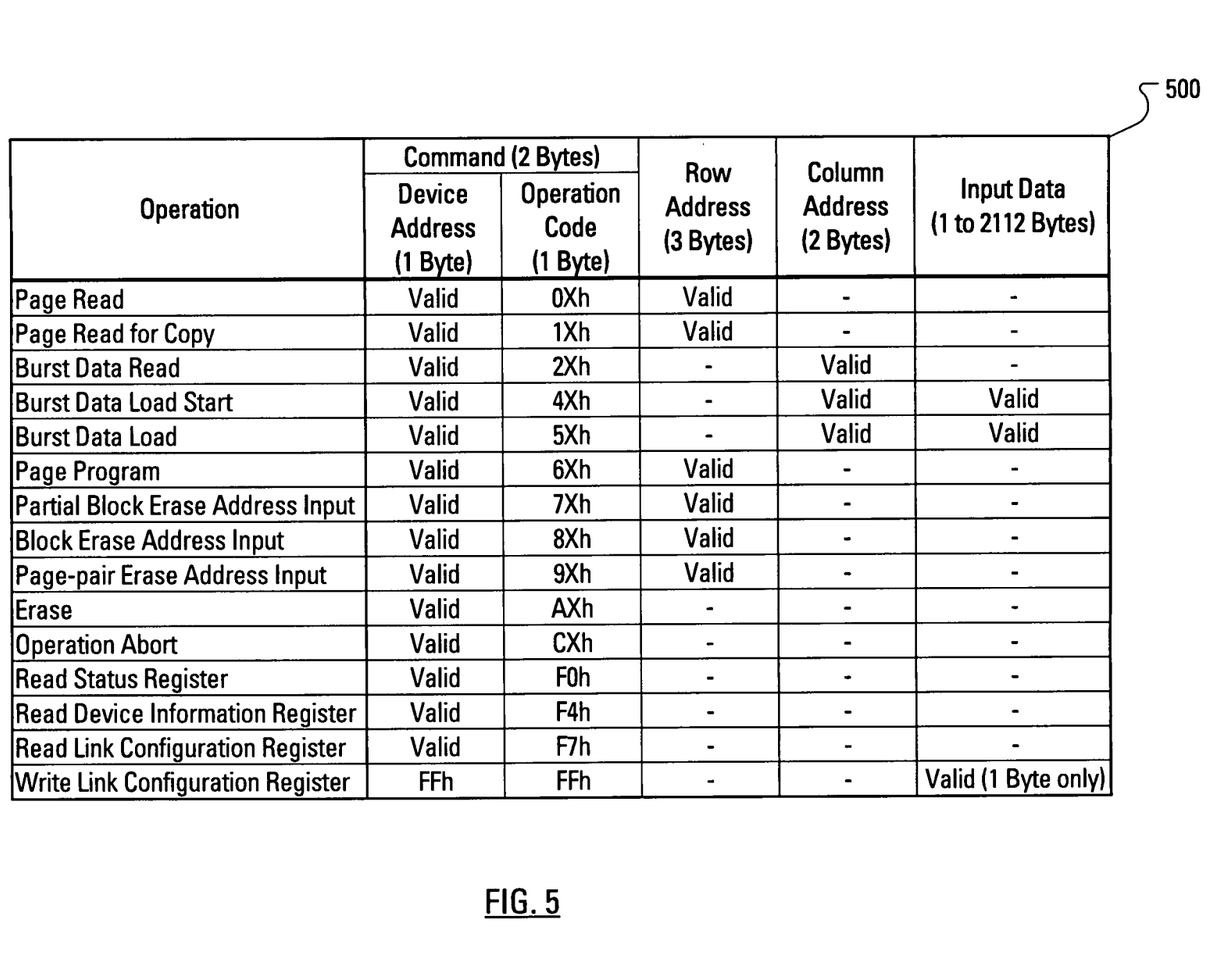
FIG. 5 illustrates, in table format, an example command set for the arrangement of FIG. 1.

An example command set for the memory device arrangement 100 of FIG. 1 is illustrated, in table format, in FIG. 5. Notably, in the Operation Code column, X=0h when the operation is to be performed on memory bank 0 and X=1h when the operation is to be performed on memory bank 1, etc. Furthermore, the "Write Link Configuration Register" command has a Device Address of FFh because the command is a "broadcasting only" command.

In overview, it is proposed herein that, under a predetermined set of circumstances, the controller 102 (to use the memory device arrangement 100 of FIG. 1) may issue a write command thereby arranging the transfer of write data without waiting for the completion of the read data transfer corresponding to a previously issued read command. An addressed memory device 104 may read data out onto the data bus according to a read command while, simultaneously, the same or another upstream memory device 104 writes data according to a write command received subsequent to the read command.

Execution of a read operation simultaneously with a write operation is possible if the memory device 104 executing the write operation is upstream of the memory device 104 executing the read operation, or if the same device 104 executes both the read and write operation. If read commands and write commands are directed towards random device addresses within a ring topology, it may be shown that a simultaneous read data transfer and write data transfer may be scheduled more than 50% of the time.

A controller that reschedules transactions may achieve a higher percentage. For example, if the controller 102 receives a read request and a write request at the same time, the requests are directed to random device addresses and there are a large number of devices in the ring, there is a roughly 50% probability that the controller 102 will be able to arrange a read data transfer to occur simultaneous with a write data transfer.

Upon determining that, based on the addresses referenced in the requests, simultaneous read and write transfer may not be arranged, the controller 102 can, for example, hold the write request in a queue until the controller 102 receives a read request addressed to a memory device 104 downstream of the memory device 104 addressed in the write request. Then, the controller 102 will be able to arrange a read data transfer to occur simultaneous with a write data transfer. With infinite queue depth, simultaneous read and write data transfer may be arranged to occur nearly 100% of the time.

Such simultaneous read and write data transfer in a ring topology may be shown to significantly improve aggregate memory bandwidth over a multi-drop bus architecture, in which any attempt to transfer read and write data at the same time will lead to a collision.

In a memory device arrangement with only one memory device 104, a read data transfer may be scheduled concurrently with a write data transfer, for corresponding simultaneous execution of a read operation and a write operation, without regard to the address.

In a memory device arrangement with two memory devices 104, a read data transfer may be scheduled concurrently with a same-device write data transfer at the first memory device 104 or at the second memory device 104, while it is also possible for the controller 102 to arrange transfer of read data from the second memory device 104 while transferring write to the first memory device 104. Therefore, with random addressing, the controller 102 can gain benefits from simultaneous read and write data transfers 75% of the time.

In general, in a memory device arrangement with N memory devices 104, simultaneous read and write data transfers are possible (N+1)/2N of the time. For large numbers of memory devices 104, this approaches a lower limit of 50% of the time. If the controller 102 can store more frequently read data towards the end of the ring, or more frequently written data towards the beginning of the ring, the probability of benefitting from simultaneous read and write data transfers can be improved.

Figure 6:
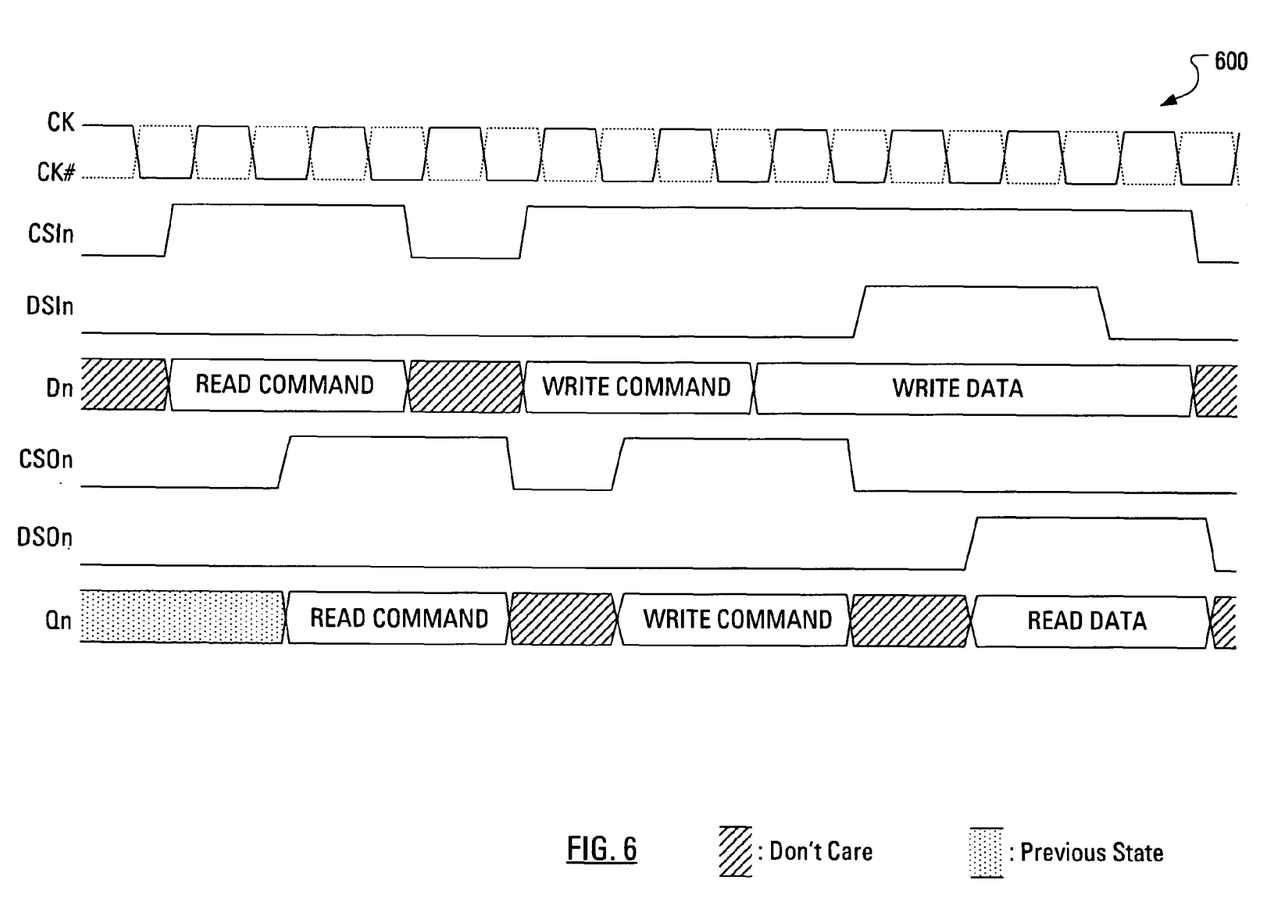
FIG. 6 illustrates a timing diagram for successive transmission of a read command and a write command.

FIG. 6 illustrates simultaneous read and write operations by the nth memory device 104. The memory device 104 receives, on an input port, a read command from the controller 102, where the read command is delineated by a signal received on a CSI port. The controller 102 thereby "primes" the memory device 104 for a read data transfer. After the CSI strobe goes low, a period of time defined by the memory device's command to command separation specification is obeyed. An example command to command separation is illustrated in FIG. 6, by way of example, as one clock cycle. Subsequent to waiting for the duration of the command to command separation, the controller 102 sends a write command followed by a write data burst to the memory device 104. The memory device 104 receives the write command followed by a write data burst on the input port. As illustrated in FIG. 3, the memory device 104 truncates the write data burst such that the write data burst is not present at the addressed memory device's output port. While the addressed memory device 104 is writing the write data burst, the controller 102 activates the DSI strobe to instruct the memory device 104 to drive read data at its output port.

Similar operation can be achieved when transmitting a write command to any memory device 104 upstream of the memory device 104 to which a read command is addressed. Note that any device further downstream of the device receiving the write data does not have to be aware that simultaneous read and write data transfers are occurring. Downstream devices will see just the write command, the read command and, possibly, the read data along with corresponding CSI and DSI strobes. Flash memory data transactions can be quite long. Typical NAND Flash memory page sizes are 2 kB or 4 kB. Depending on the application, data bursts as long as the page size may be desired. With such long data bursts, the bus overhead in providing read and write instructions will be negligible and the ring can be shown to achieve close to 100% utilization for simultaneous read and write operations.

As will be apparent to a person of ordinary skill in the art, the present disclosure applies equally to ring arrangements with synchronous clock as it applies to ring arrangements with parallel clock, for which the examples are illustrated.

It will be understood that when an element is herein referred to as being "connected" to another element, it can be directly connected to the other element or intervening elements may be present. In contrast, when an element is herein referred to as being "directly connected" to another element, there are no intervening elements present. Other words used to describe the relationship between elements should be interpreted in a like fashion (i.e., "provide" versus "directly provide", "receive" versus "directly receive", etc.).

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method for controlling a plurality of memory devices connected in a ring arrangement with a memory device controller such that output from a given memory device in said plurality of memory devices is received as input by one next downstream memory device in said plurality of memory devices, said memory device controller arranged so that an initial memory device in said plurality of memory devices receives output from said controller as input and a final memory device in said plurality of memory devices provides output as input to said controller, said method comprising:
    transmitting a read command, said read command addressing a first memory device among said plurality of memory devices;
    transmitting a write command followed by write data, said write command addressing a second memory device among said plurality of memory devices, said second memory device being in an upstream location relative to said first memory device; and
    arranging for read data to be transferred downstream from said first memory device to the memory controller while, at least substantially simultaneously, receipt of said write data at said second memory device occurs.

2. The method of claim 1 further comprising transmitting, in conjunction with said transmitting said read command, a logical high signal on a command strobe line.

3. The method of claim 2 further comprising transmitting, in conjunction with said transmitting said write command followed by said write data, a logical high signal on said command strobe line.

4. The method of claim 3 further comprising transmitting, while transmitting said logical high signal on said command strobe line in conjunction with said transmitting said write command, a logical high signal on a data strobe line.

5. The method of claim 1 further comprising waiting a duration of a command to command separation time period between said transmitting said read command and said transmitting said write command.

6. A memory device controller for controlling a plurality of memory devices connected in a ring arrangement such that output from a given memory device in said plurality of memory devices is received as input by one next downstream memory device in said plurality of memory devices, said memory device controller arranged so that an initial memory device in said plurality of memory devices receives output from said controller as input and a final memory device in said plurality of memory devices provides output as input to said controller, said controller configured to:
    transmit a read command, said read command addressing a first memory device among said plurality of memory devices;
    transmit a write command followed by write data, said write command addressing a second memory device among said plurality of memory devices, said second memory device being in an upstream location relative to said first memory device; and
    arrange for read data to be transferred downstream from said first memory device to the memory controller while, at least substantially simultaneously, receipt of said write data at said second memory device occurs.

7. A memory system comprising:
    a plurality of memory devices connected in a ring arrangement such that output from a given memory device in said plurality of memory devices is received as input by one next downstream memory device in said plurality of memory devices;
    a memory device controller arranged so that an initial memory device in said plurality of memory devices receives output from said controller as input and a final memory device in said plurality of memory devices provides output as input to said controller, said controller configured to:
        transmit a read command, said read command addressing a first memory device among said plurality of memory devices;
        transmit a write command followed by write data, said write command addressing a second memory device among said plurality of memory devices, said second memory device being in an upstream location relative to said first memory device; and arrange for read data to be transferred downstream from said first memory device to the memory controller while, at least substantially simultaneously, receipt of said write data at said second memory device occurs.

8. A method for controlling a plurality of memory devices connected in a ring arrangement with a memory device controller such that output from a given memory device in said plurality of memory devices is received as input by one next downstream memory device in said plurality of memory devices, said memory device controller arranged so that an initial memory device in said plurality of memory devices receives output from said controller as input and a final memory device in said plurality of memory devices provides output as input to said controller, said method comprising:
- transmitting a read command, said read command addressing a memory device among said plurality of memory devices;
- transmitting a write command followed by write data, said write command addressing said memory device; and
- arranging for read data to be transferred downstream from said memory device to the memory controller while, at least substantially simultaneously, receipt of said write data at said memory device occurs.

9. At a memory device in a ring arrangement, a method of handling commands, said method comprising:
- receiving a read command on an input port of said memory device;
- subsequent to said receiving said read command, receiving a write command followed by write data on said input port; and
- transmitting read data, read from said memory device, on an output port of said memory device according to said read command while, at least substantially simultaneously, receiving at least a portion of said write data on said input port.

10. The method of claim 9 further comprising transmitting, in conjunction with said transmitting said read data, a logical high signal on a data strobe line.

11. The method of claim 9 further comprising transmitting said read command to a next memory device in said ring arrangement.

12. The method of claim 11 further comprising transmitting, in conjunction with said transmitting said read command, a logical high signal on a command strobe line.

13. The method of claim 12 further comprising transmitting said write command to said next memory device in said ring arrangement.

14. The method of claim 13 further comprising transmitting, in conjunction with said transmitting said write command, said logical high signal on said command strobe line.

15. A memory device in a ring arrangement configured to:
- receive a read command on an input port of said memory device;
- receive, subsequent to said receiving said read command, a write command followed by write data on said input port; and
- transmit read data, read from said memory device, on an output port of said memory device according to said read command while, at least substantially simultaneously, receiving at least a portion of said write data on said input port.

* * * * *